US012641624B2

(12) United States Patent

Xu et al.

(10) Patent No.: US 12,641,624 B2

(45) Date of Patent: May 26, 2026

(54) INFORMATION TRANSMISSION METHOD, APPARATUS AND DEVICE, AND STORAGE MEDIUM

(71) Applicant: ZTE CORPORATION, Shenzhen (CN)

(72) Inventors: Hanqing Xu, Shenzhen (CN); Xincai Li, Shenzhen (CN); Li Tian, Shenzhen (CN); Ling Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 357 days.

(21) Appl. No.: 18/549,130

(22) PCT Filed: Nov. 10, 2021

(86) PCT No.: PCT/CN2021/129755

§ 371 (c)(1),
(2) Date: Sep. 5, 2023

(87) PCT Pub. No.: WO2022/183765

PCT Pub. Date: Sep. 9, 2022

(65) Prior Publication Data

US 2024/0155646 A1 May 9, 2024

(30) Foreign Application Priority Data

Mar. 5, 2021 (CN) .......................... 202110244780.4

(51) Int. Cl.
*H04W 72/232* (2023.01)
*H04L 5/00* (2006.01)
(Continued)

(52) U.S. Cl.
CPC ..... *H04W 72/232* (2023.01); *H04W 72/0446* (2013.01); *H04W 72/12* (2013.01); *H04L 5/0007* (2013.01)

(58) Field of Classification Search
CPC H04L 5/0007; H04W 72/12; H04W 72/0446; H04W 72/232
(Continued)

(56) References Cited

U.S. PATENT DOCUMENTS 11,743,013 B2 * 8/2023 Zhang ................... H04W 72/23
370/329
2018/0206263 A1 * 7/2018 Lin ..................... H04W 56/003
(Continued)

FOREIGN PATENT DOCUMENTS

CN 111512575 A 8/2020
CN 111989965 A 11/2020
(Continued)

OTHER PUBLICATIONS

International Search Report in Application No. PCT/CN2021/129755, dated Jan. 30, 2022, 4 pages, including translation.
(Continued)

*Primary Examiner* — Peter G Solinsky
(74) *Attorney, Agent, or Firm* — Morgan, Lewis & Bockius LLP

(57) ABSTRACT

Provided are an information transmission method, apparatus and device, and a storage medium. The method includes detecting a physical downlink control channel (PDCCH) on multiple consecutive orthogonal frequency-division multiplexing (OFDM) symbols of one or more slots.

13 Claims, 5 Drawing Sheets

Send a physical downlink control channel (PDCCH) on multiple consecutive OFDM symbols of one or more slots so that a first communication node detects the PDCCH

S21

(51) Int. Cl.
*H04W 72/0446* (2023.01)
*H04W 72/12* (2023.01)

(58) Field of Classification Search
USPC ......................................................... 370/329
See application file for complete search history.

(56) References Cited

U.S. PATENT DOCUMENTS

| | | | | |
|---|---|---|---|---|
| 2020/0022139 A1* | 1/2020 | Zhou | ................. | H04W 72/0446 |
| 2022/0046613 A1* | 2/2022 | Lee | ....................... | H04L 5/0053 |
| 2022/0209904 A1* | 6/2022 | Jang | ..................... | H04L 1/1896 |
| 2022/0240111 A1* | 7/2022 | Jang | ..................... | H04W 72/23 |
| 2023/0155873 A1* | 5/2023 | Yao | ...................... | H04L 5/0053 |
| | | | | 370/329 |
| 2023/0164801 A1* | 5/2023 | Yang | .................... | H04W 72/23 |
| | | | | 370/329 |
| 2023/0262449 A1* | 8/2023 | Ying | ................... | H04L 5/0044 |
| | | | | 370/329 |

FOREIGN PATENT DOCUMENTS

| | | | | |
|---|---|---|---|---|
| WO | WO-2020089854 A1 | 7/2020 | | |
| WO | WO-2020197355 A1 | 10/2020 | | |
| WO | WO-2022187547 A1 * | 9/2022 | .......... | H04L 1/0046 |

OTHER PUBLICATIONS

Moderator Lenovo. "RI-2102142 Feature lead summary#2 for [104-e-NR-52-71GHz-02] on PDCCH monitoring enhancements" 3GPP tsg_ran\wg1_rl1, Feb. 5, 2021.

Extended European Search Report in Application No. 21928838.8, dated Feb. 20, 2025, 12 pages.

Ericsson, "On PDCCH Repetition for URLLC", 3GPP TSG RAN WG1 Meeting 92, R1-1801565, Athens, Greece, Feb. 26-Mar. 2, 2018.

ZTE, "On PDCCH enhancements for URLLC", 3GPP TSG RAN WG1 Ad-Hoc Meeting 1901, R1-1900069, Taipei, Jan. 21-25, 2019.

Lenovo, "Feature lead summary for [104-e-NR-52-71GHz-02] Email discussion/approval on PDCCH monitoring enhancements", 3GPP TSG RAN WG1#104-e, R1-2101874, e-Meeting, Jan. 25-Feb. 5, 2021.

* cited by examiner

Detect a physical downlink control channel (PDCCH) on multiple
consecutive OFDM symbols of one or more slots          S11

Send a physical downlink control channel (PDCCH) on multiple
consecutive OFDM symbols of one or more slots so that a first
communication node detects the PDCCH          S21

One RU

REG4 | REG5 | REG6 | REG7

REG
bundle
1

REG0 | REG1 | REG2 | REG3

REG
bundle
0

REG4 | REG5 | REG6 | REG7

REG0 | REG1 | REG2 | REG3

REG
bundle 0

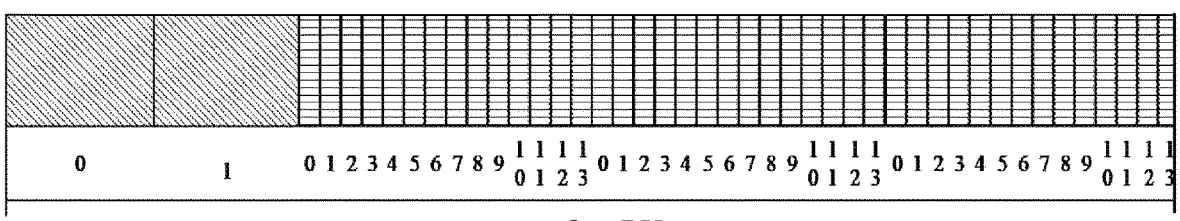
FIG. 8
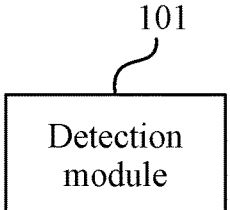
One RU
FIG. 9
101
Detection module
FIG. 10
111
Sending module
FIG. 11
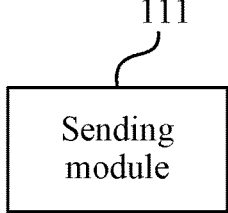

INFORMATION TRANSMISSION METHOD, APPARATUS AND DEVICE, AND STORAGE MEDIUM

CROSS REFERENCE TO RELATED APPLICATIONS

This is a National Stage Application, filed under 35 U.S.C. 371, of International Patent Application No. PCT/CN2021/129755, filed on Nov. 10, 2021, which claims priority to Chinese Patent Application No. 202110244780.4 filed with the China National Intellectual Property Administration (CNIPA) on Mar. 5, 2021, the disclosures of which are incorporated herein by reference in their entireties.

TECHNICAL FIELD

The present application relates to the field of communication technology, for example, an information transmission method, apparatus and device, and a storage medium.

BACKGROUND

When new radio (NR) operates in a high-frequency band (greater than 52.6 GHz), a large sub-carrier spacing (SCS) such as 480 kHz and 960 kHz is typically used. In this case, the duration of a slot in the time domain is very short. If a physical downlink control channel (PDCCH) still adopts the transmission method in the related art, that is, the PDCCH is transmitted on less than or equal to three orthogonal frequency-division multiplexing (OFDM) symbols, the time is very transient, leading to poor coverage and reduced reliability.

SUMMARY

The present application provides an information transmission method, apparatus and device, and a storage medium.

Embodiments of the present application provide an information transmission method. The method is applied to a first communication node and includes the following:

A PDCCH is detected on multiple consecutive OFDM symbols of one or more slots.

Embodiments of the present application provide an information transmission method. The method is applied to a second communication node and includes the following:

A PDCCH is sent on a plurality of consecutive OFDM symbols of one or more slots so that a first communication node detects the PDCCH.

Embodiments of the present application provide an information transmission apparatus. The apparatus is configured in a first communication node and includes a detection module.

The detection module is configured to detect a PDCCH on multiple consecutive OFDM symbols of one or more slots.

Embodiments of the present application provide an information transmission apparatus. The apparatus is configured in a second communication node and includes a sending module.

The sending module is configured to send a PDCCH on multiple consecutive OFDM symbols of one or more slots so that a first communication node detects the PDCCH.

Embodiments of the present application provide an information transmission device. The device includes one or more processors and a memory.

The memory is configured to store one or more programs.

The one or more programs, when executed by the one or more processors, cause the one or more processors to perform the information transmission method described in any one of the preceding embodiments.

Embodiments of the present application provide a computer storage medium storing a computer program that, when executed by a processor, performs the information transmission method described in any one of the preceding embodiments.

The preceding embodiments and other aspects of the present application and implementations thereof are described in more detail in the brief description of drawings, detailed description, and claims.

BRIEF DESCRIPTION OF DRAWINGS

FIG. 8 is a diagram illustrating that a PDCCH is mapped to eight OFDM symbols according to an embodiment of the present application.

FIG. 9 is a diagram illustrating the structure of another resource unit according to an embodiment of the present application.

FIG. 10 is a diagram illustrating an information transmission apparatus according to an embodiment of the present application.

FIG. 11 is a diagram illustrating an information transmission apparatus according to an embodiment of the present application.

DETAILED DESCRIPTION

Figures 1, 2, 3:
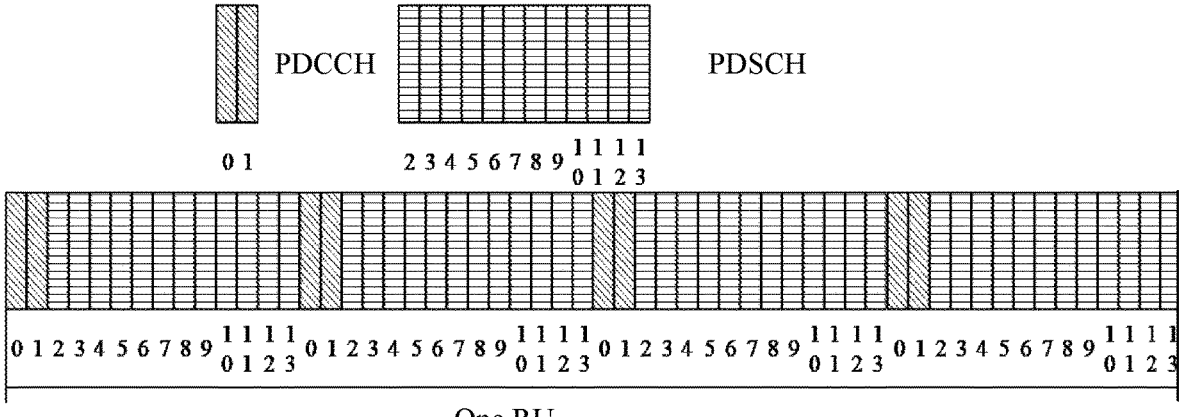
FIG. 1 is a flowchart of an information transmission method according to an embodiment of the present application.
FIG. 2 is a flowchart of an information transmission method according to an embodiment of the present application.
FIG. 3 is a diagram illustrating the structure of a resource unit according to an embodiment of the present application.

Embodiments of the present application are described hereinafter in detail in conjunction with drawings. It is to be noted that if not in collision, embodiments of the present application and features therein may be combined with each other in any manner.

Procedures illustrated in flowcharts among the drawings may be executed by, for example, a computer system capable of executing a set of computer-executable instructions. Moreover, although logical sequences are illustrated in the flowcharts, the procedures illustrated or described may be performed in sequences different from those described herein in some cases.

The technical schemes of the present application may be applied to various communication systems such as the global system of mobile communication (GSM), the code division multiple access (CDMA) system, the wideband code division multiple access (WCDMA) system, the general packet radio service (GPRS), the long term evolution (LTE) system, the advanced long term evolution (LTE-A) system, the universal mobile telecommunication system (UMTS), and the fifth generation wireless (5G) systems, which are not limited in embodiments of the present application. In the present application, the 5G system is used as an example.

In embodiments of the present application, a base station may be a device capable of communicating with a user terminal. The base station may be any device having a wireless receiving-sending function, including, but not limited to, a base station (NodeB), an evolved base station (eNodeB), a base station in the 5G communication system, a base station in a future communication system, an access node in a wireless fidelity (WiFi) system, a wireless relay node, and a wireless backhaul node. The base station may also be a radio controller in a cloud radio access network (CRAN) scenario. The base station may also be a small cell and a transmission and reception point (TRP), which is not limited in embodiments of the present application. In the present application, a 5G base station is used as an example.

In embodiments of the present application, a user terminal is a device having a wireless receiving-sending function. The user terminal may be deployed on land including being indoor or outdoor, handled, wearable, or vehicle-mounted; may also be deployed on water (for example, in ships); or may also be deployed in the air (for example, in airplanes, balloons, and satellites). The user terminal may be a mobile phone, a pad, a computer having the wireless receiving-sending function, a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, and a wireless terminal in a smart home. The application scenario is not limited by embodiments of the present application. The user terminal may also sometimes be called a terminal, an access terminal, a user equipment (UE) unit, a UE station, a mobile station, a mobile platform, a remote station, a remote terminal, a mobile device, a UE terminal, a wireless communication device, a UE agent, or a UE device. The name is not limited in embodiments of the present application.

When the NR operates in a high-frequency band (greater than 52.6 GHz), a large SCS such as 480 kHz and 960 kHz is typically used. In this case, the duration of a slot in the time domain is very short. If a PDCCH still adopts the transmission method in the related art, that is, the PDCCH is transmitted on less than or equal to three OFDM symbols, the time is very transient, leading to poor coverage and reduced reliability.

In addition, a multi-slot PDCCH detection opportunity strategy and a scheduling mechanism in which one PDCCH is used to schedule multiple physical downlink shared channels (PDSCHs) and one PDCCH is used to schedule multiple physical uplink shared channels (PUSCHs) are adopted in the high-frequency band. Therefore, once downlink control information (DCI) is lost, data scheduling and transmission are greatly affected, which is unfavorable for improving data transmission efficiency, and greatly affects the system performance.

Currently, in a low-frequency band, the number of orthogonal frequency-division multiplexing (OFDM) symbols occupied by a PDCCH of the NR is configured by the configuration of the duration in a control resource set (CORESET), and the value range for the number of OFDMs is $\{1, 2, 3\}$, that is, one PDCCH is mapped to the maximum of three OFDM symbols. Meanwhile, a demodulation reference signal (DMRS) and a PDCCH are multiplexed in a frequency-division multiplexing (FDM) manner, that is, the DMRS and the PDCCH respectively occupy different resource elements (REs) of the same OFDM symbol. In the related art, the PDCCH, the PDSCH and the PUSCH have the same SCS for the same bandwidth part (BWP).

For an area with control requirements for unlicensed carriers, a base station performs listen before talk (LBT) before sending a PDCCH. If the LBT fails, the base station cannot send the PDCCH, and only if the base station successfully performs the LBT can the base station send the PDCCH.

An information transmission method, apparatus and device, and a storage medium are described in detail in conjunction with the following embodiments:

In an embodiment, this embodiment of the present application provides an information transmission method. The method may be executed by an information transmission apparatus that may be implemented by software and/or hardware. The information transmission method is applied to a first communication node that may be any terminal mentioned above, which is not limited in this embodiment.

As shown in FIG. 1, the information processing method provided in this embodiment of the present application mainly includes S11.

S11: A PDCCH is detected on multiple consecutive OFDM symbols of one or more slots.

In an embodiment, detecting the PDCCH on the multiple consecutive OFDM symbols of the one or more slots includes detecting the PDCCH on M consecutive OFDM symbols of N slots, where N is an integer greater than or equal to 1, and M is a positive integer greater than 3.

In an embodiment, detecting the PDCCH on the multiple consecutive OFDM symbols of the one or more slots includes detecting a PDCCH transmitted in a repetitive manner on the multiple consecutive OFDM symbols of the one or more slots.

In an embodiment, for the repetitive manner, different SCSs are configured with different numbers of repetitions of a PDCCH.

In this embodiment, time-domain repetition number configuration information is included in PDCCH higher-layer configuration parameters. For example, different SCSs may be configured with different values of a repetition factor. The repeated transmission of the PDCCH may occupy one or more slots at most.

In an embodiment, the method also includes that it is determined that the PDCCH is transmitted in the repetitive manner in one of the following: configuring a CORESET repetition parameter or a PDCCH repetition factor included in a configured search space.

In an example embodiment, the UE first determines the number of OFDM symbols occupied by the PDCCH without repetition according to the corresponding PDCCH symbol number parameter (such as duration) in the CORESET, then repeatedly receives the PDCCH according to a repetition factor parameter configured in the search space, and then combines each repeated data to demodulate the PDCCH.

Alternatively, the CORESET configuration includes the repetition factor parameter in addition to the duration parameter.

In an example embodiment, the repetition factor parameter is added in the search space configuration and indicates the number of consecutive repetitions of the PDCCH.

In an embodiment, detecting the PDCCH on the multiple consecutive OFDM symbols of the one or more slots includes detecting a PDCCH transmitted in a non-repetitive mapping manner on the multiple consecutive OFDM symbols of one slot.

In an embodiment, for the non-repetitive mapping manner, different SCSs support different maximum PDCCH symbol numbers.

In an embodiment, for the non-repetitive mapping manner, the value of the duration in a CORESET configuration is any integer between 3 and 14.

In this embodiment, the value range of the duration in the CORESET configuration in the related art is modified. For example, the configured value range of the duration corresponding to different SCSs is different.

In an embodiment, for the non-repetitive mapping manner, mapping one PDCCH to multiple OFDM symbols includes one of the following:

modifying the number of resource element groups (REGs) included in one REG bundle to $$m \times N_{symb}^{CORESET}$$

and modifying the number of REGs included in one control channel element (CCE) to $$m \times N_{symb}^{CORESET},$$

where m and n are positive integers greater than 1;

limiting a CCE aggregation level supported by one PDCCH such that one PDCCH occupies an integer number of REG bundles; or modifying a REG serial number to the frequency domain first.

In an embodiment, the PDCCH and a scheduled PDSCH or PUSCH adopt different SCSs.

In an embodiment, the PDCCH carries beam indication information used for indicating a beam for sending and receiving data.

In an embodiment, this embodiment of the present application provides an information transmission method. The method may be executed by an information transmission apparatus that may be implemented by software and/or hardware. The information processing method is applied to a second communication node that may be any base station mentioned above, which is not limited in this embodiment.

As shown in FIG. 2, the information processing method provided in this embodiment of the present application mainly includes S21.

S21: A PDCCH is sent on multiple consecutive OFDM symbols of one or more slots so that a first communication node detects the PDCCH.

In an embodiment, sending the PDCCH on the multiple consecutive OFDM symbols of the one or more slots includes one of sending the PDCCH continuously in a repetitive manner on the one or more slots or mapping the PDCCH to multiple OFDM symbols of one slot in a non-repetitive manner.

In an embodiment, the method also includes the following:

The PDCCH uses a default SCS.

In this embodiment, the PDCCH uses the default SCS for the high-frequency band. For example, in the case of 120 kHz, the SCS of the PDCCH is not the same as the configured SCS of the BWP, while the SCS of the PDSCH is still the same as the configured SCS of the BWP. Therefore, when the configured SCS of an active BWP is not 120 kHz, the downlink transmission adopts a mixed numerology method.

In an embodiment, the method also includes sending, through different PDCCHs, the same DCI to the same first communication node by multiple TRPs.

In an embodiment, sending the same DCI to the same first communication node through the different PDCCHs by the multiple TRPs includes one of the following:

sending, by different TRPs, the PDCCHs to the same first communication node in a time-division multiplexing (TDM) manner; or sending, by different TRPs, the same DCI to the same first communication node through the different PDCCHs in a frequency-division multiplexing (FDM) manner.

In an applicable embodiment, for a downlink channel PDCCH (assuming the PDCCH is configured to occupy two OFDM symbols) in a high-frequency band, if the original downlink transmission mapping rule is still followed, the structure of a downlink channel with the SCS of 480 kHz in one resource unit (RU) (such as 0.125 ms, which corresponds to a slot in the case of the SCS of 120 kHz) is shown in FIG. 3.

In addition, in the high-frequency band, multi-PDSCH scheduling and multi-slot PDCCH detection granularity are supported, resulting in rarer OFDM symbols occupied by the PDCCH in the entire time domain and a very short period of time.

Figure 4:
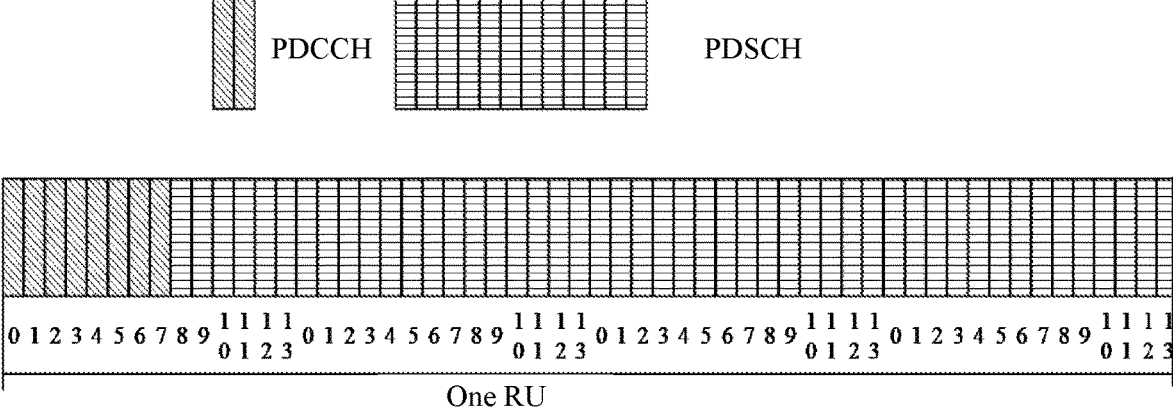
FIG. 4 is a diagram illustrating the structure of another resource unit according to an embodiment of the present application.

From the above, the original transmission method is not conducive to the coverage and reliability of the PDCCH. Therefore, the transmission structure of the downlink channel needs to be modified. The SCS of 480 kHz is used as an example. The structure of downlink control and services within one RU (0.125 ms) may be shown in FIG. 4. That is, one PDCCH may be mapped to more than three consecutive symbols. Alternatively, some other methods for improving the coverage and reliability of the PDCCH are considered.

To improve the coverage performance and reliability of a high-frequency PDCCH, four methods are provided in this embodiment.

Method one: The PDCCH is sent in a repetitive manner on multiple consecutive OFDM symbols of one or more slots.

For example, different SCS s support different maximum PDCCH symbol numbers, and different SCSs are configured with different numbers of repetitions of the PDCCH.

Method two: The PDCCH is mapped to more than three consecutive OFDM symbols on one slot in a non-repetitive manner.

For example, different SCSs support different maximum PDCCH symbol numbers, and different SCSs are configured with different numbers of repetitions of the PDCCH.

For example, when the SCS is 480 k, the number of symbols occupied by the PDCCH may be 4, 8, or 12 (originally, the number of symbols occupied by the PDCCH is one of 1 to 3). When the SCS is 960 k, the number of symbols occupied by the PDCCH may be 8, 16, or 24.

For example, the method also includes increasing the number of symbols of the CORESET.

For example, the PDCCH structure is extended to more than three OFDM symbols in one of the following methods:

Method one: Both the original number of REGs included in one CCE and the original number of REGs included in one REG bundle are modified. One REG bundle includes $$m \times N_{symb}^{CORESET}$$

REGs and one CCE includes $$n \times N_{symb}^{CORESET}$$

REGs, where m and n are positive integers greater than 1.

Manner two: The number of REGs included in the CCE is not modified, and a CCE aggregation level supported by one PDCCH is limited such that the one PDCCH occupies an integer number of REG bundles. Meanwhile, the higher layer configures the duration in the CORESET to be that $$N_{symb}^{CORESET} \in 4,8,12.$$

Manner three: A REG serial number is modified to the frequency domain first.

Manner three: The PDCCH uses the default SCS regardless of the configured SCS of the BWP. When the configured SCS of the active BWP is not 120 kHz, the downlink transmission adopts a mixed SCS sending mode.

Manner four: By multiple TRPs, the same PDCCH is sent to the same UE.

For example, the sending mode between multiple TRPs includes the FDM and the TDM.

For example, the PDCCH and the corresponding DMRS may be transmitted on different OFDM symbols in the TDM manner so that the channel estimation performance of the DMRS is improved, thereby improving the demodulation performance of the PDCCH.

For example, the PDCCH carries beam indication information by which the UE may receive downlink data on the beam or perform uplink channel sharing.

This embodiment describes the method in which the PDCCH is sent continuously in a repetitive manner on one or more slots to improve the coverage performance of the PDCCH, which is mentioned in method one.

Time-domain repetition number configuration information is included in PDCCH higher-layer configuration parameters. For example, different SCSs may be configured with different values of the repetition factor. The repeated transmission of the PDCCH may occupy one or more slots at most.

For example, the repetition factor parameter is added in the search space configuration and indicates the number of consecutive repetitions of the PDCCH. For example, for the PDCCH with the SCS of 120 kHz, the set of configured repetition factors is {1, 2, 4, 8}; for the PDCCH with the SCS of 480 kHz, the set of configured repetition factors is {4, 8, 16, 32}; and for the PDCCH with the SCS of 960 kHz, the set of configured repetition factors is {8, 16, 32, 64}.

The UE first determines the number of OFDM symbols occupied by the PDCCH without repetition according to the corresponding PDCCH symbol number parameter (duration) in the CORESET, then repeatedly receives the PDCCH according to the repetition factor parameter configured in the search space, and then combines each repeated data to demodulate the PDCCH.

Figure 5:
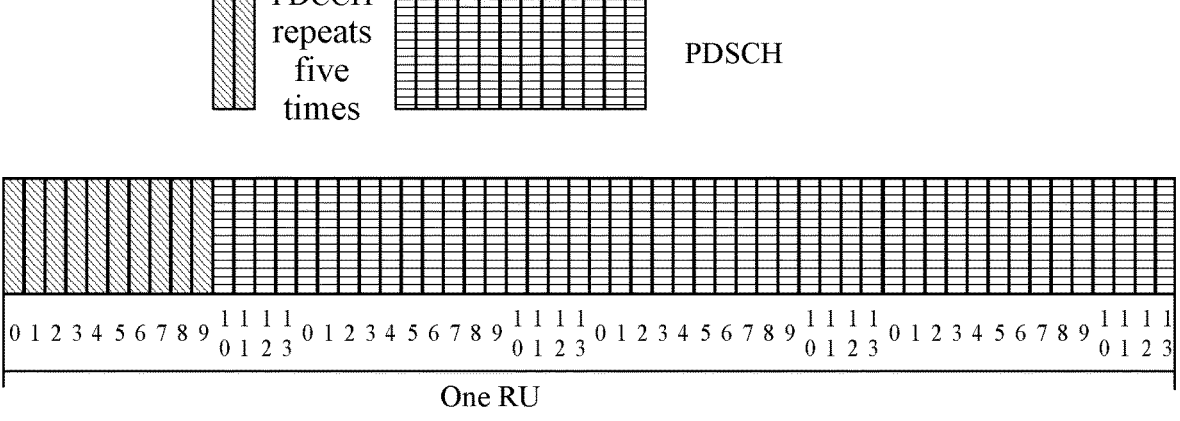
FIG. 5 is a diagram illustrating the structure of another resource unit according to an embodiment of the present application.

Assuming that the value of the repetition factor configured in the search space is 4 and the value of the corresponding PDCCH symbol number parameter (duration) in the CORESET is 2, eight consecutive symbols of the PDCCH in one slot are transmitted in a repetitive manner, and later starting from the third symbol, the PDCCH is repeatedly transmitted three times, that is, the PDCCH is repeatedly transmitted four times in one slot. If the value of the duration is configured to be 2, and the value of the repetition factor is configured to be 5, the PDCCH is repeatedly transmitted on ten OFDM symbols in units of two symbols, as shown in FIG. 5.

Alternatively, the CORESET configuration includes a repetition factor parameter in addition to the duration parameter.

For example, the repetition number parameter contained in the CORESET configuration is 3 and represents that the CORESET is repeated three times in succession.

In the repetitive transmission manner, the original design in which one CCE of the PDCCH includes six REGs may not be changed, and the PDCCH is repeatedly transmitted in units of the value configured in the duration to improve the coverage performance of the PDCCH.

This embodiment describes the configuration implementation method in which the PDCCH is mapped to more than three consecutive OFDM symbols on one slot in a non-repetitive manner, which is described in method two.

First, it is necessary to modify the value range of the duration in the CORESET configuration in the related art. For example, the configured value range of the duration corresponding to different SCSs is different.

Figures 6, 7:
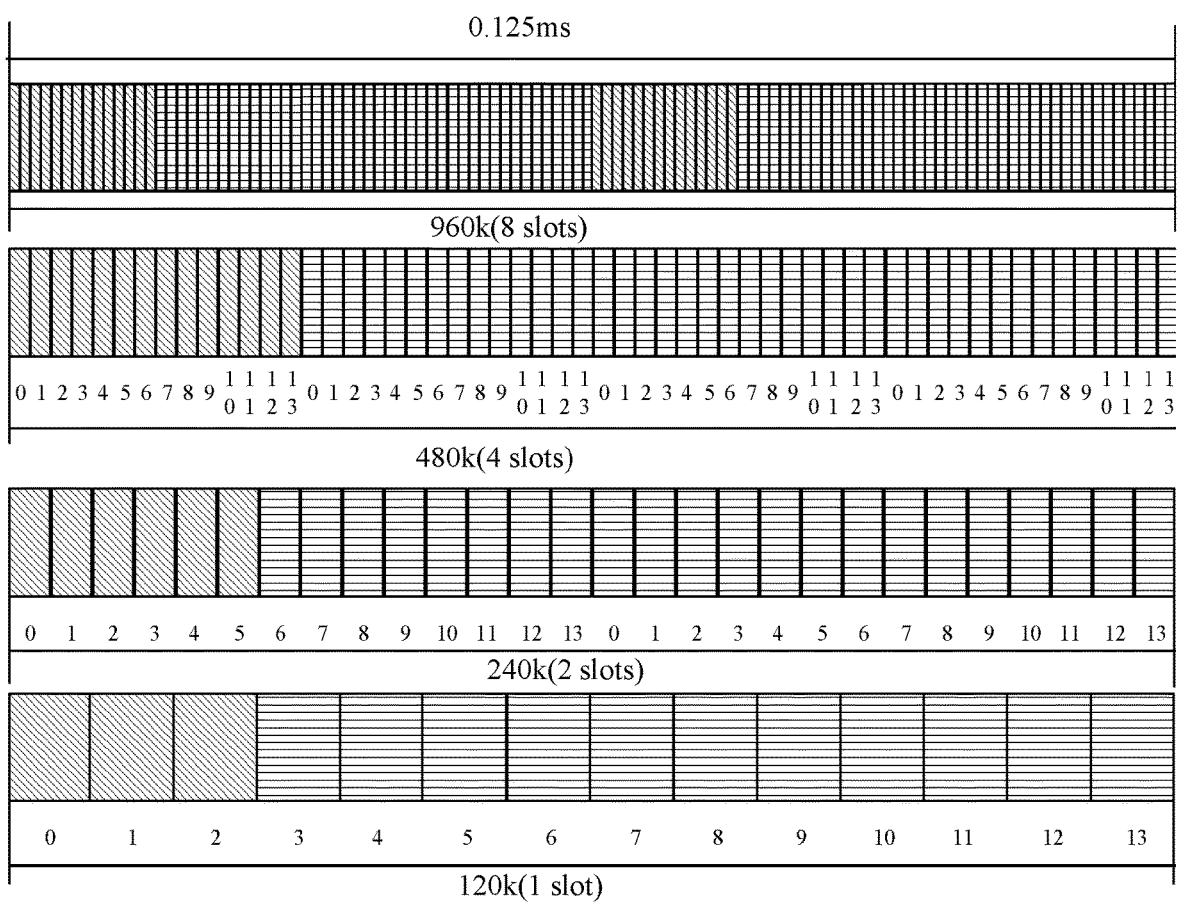
FIG. 6 is a diagram illustrating that a PDCCH is configured with a different number of symbols under a different SCS according to an embodiment of the present application.
FIG. 7 is a diagram illustrating that a PDCCH is mapped to four OFDM symbols according to an embodiment of the present application.

For example, for the PDCCH with the SCS of 120 kHz, the current value range of 1 to 3 OFDM symbols may be modified to the range of 2 to 14 OFDM symbols, that is, the PDCCH may occupy up to fourteen OFDM symbols. For the SCS of 480 kHz, the configuration range of the duration may be {4 to 14×n}, and for the SCS of 960 kHz, the configuration range of the duration may be {8 to 14×m}, where m and n are positive integers and are less than or equal to 4. As shown in FIG. 6, the number of symbols that is configurable for one PDCCH under different SCSs may be different. The slashed box represents the number of OFDM symbols occupied by the PDCCH. The horizontal-line box represents OFDM symbols occupied by the PDSCH. In a transmission unit of 0.125 ms, the number of symbols occupied by the PDCCH may be two slots at 960 kHz, and the number of symbols occupied by the PDCCH may be one slot, that is, fourteen OFDM symbols, at 480 kHz. At 240 kHz, the number of symbols occupied by the PDCCH may be six OFDM symbols, and at 120 kHz, the number of symbols occupied by the PDCCH may be three OFDM symbols.

The PDCCH is finally mapped to resources of the corresponding number of symbols according to the configuration information. The mapping method is described in detail in the following embodiments. With this configuration, the transmission coverage performance of the PDCCH can be improved.

In this embodiment, the mapping method of how a base station maps the PDCCH to more than three symbols is described in detail.

In the NR, resource mapping is performed on the PDCCH in units of REG bundles. One REG bundle uses the same precoding matrix. The precoding granularity is originally a parameter defined for the frequency domain, in units of L that equals 2, 3, or 6. The mapping process of a CCE to a REG bundle is as follows: One CCE is mapped to 6/L REG bundles; where one REG includes resource blocks (RBs) of one symbol, one REG bundle includes L REGs, and L is equal to 2, 3, or 6. The interleaved mapping is also performed in units of REG bundles according to the principle of row-in and column-out. For the non-interleaved mapping, L=6.

Here, a PDCCH occupying four symbols is used as an example. If the CCE aggregation level is 1, a CCE needs to be modified to include four or eight RGEs so that the PDCCH may be mapped to four OFDM symbols, as shown in FIG. 7. Alternatively, the case where one CCE includes six REGs is not modified, but the CCE aggregation level supported by one PDCCH is 2 or higher, that is, one PDCCH occupies at least twelve REGs. In this manner, one PDCCH may also be mapped to four OFDM symbols.

Also, if the PDCCH is mapped to eight OFDM symbols, the current REG bundle whose size is 2, 3, or 6 cannot provide support. Then the number of REGs included in one REG bundle should be expanded, that is, L=8, as shown in FIG. 8. Meanwhile, it is necessary to expand the number of REGs included in one CCE, and one CCE includes at least eight REGs. Alternatively, the size of one CCE is not modified, but the aggregation level supported by the PDCCH must be 4 or higher, that is, one PDCCH includes three REG bundles.

In summary, the transmission of one PDCCH mapped to more than three OFDM symbols may use one of the following three manners:

Manner one: Both the original number of REGs included in one CCE and the original number of REGs included in one REG bundle are modified. One REG bundle includes $$m \times N_{symb}^{CORESET}$$

REGs and one CCE includes $$n \times N_{symb}^{CORESET}$$

REGs, where m and n are positive integers greater than 1.

Manner two: The number of REGs included in the CCE is not modified, and a CCE aggregation level supported by one PDCCH is limited such that one PDCCH occupies an integer number of REG bundles.

Manner three: A REG serial number is modified to the frequency domain first.

In one of the preceding manners, one PDCCH may be mapped to more than three OFDM symbols in a non-repetitive manner.

Another method for improving the coverage of the PDCCH is described in this embodiment.

For the downlink transmission in a high-frequency band, the mixed numerology may be used, that is, the PDCCH may use the default SCS of 120 kHz regardless of the SCSs of other channels. In this case, the PDCCH and the PDSCH use different SCSs, that is, the mixed numerology.

The implementation method includes the following:

For the high-frequency band, the PDCCH adopts the default SCS, for example, 120 kHz. The SCS of the PDCCH is not the same as the configured SCS of the BWP, while the SCS of the PDSCH is still the same as the configured SCS of the BWP. Therefore, when the configured SCS of the active BWP is not 120 kHz, the downlink transmission adopts the mixed numerology mode.

Currently, the SCS is configured during BWP configuration. If all channel signals are not reconfigured independently, this uniform SCS is used. For example, for the same UE, the PDCCH uses 120 k by default in the high-frequency, while the PDSCH uses 480 k. At this time, the values of K0, K1, and K2 in the timing relationship between scheduling transmission and hybrid automatic repeat request acknowledgment (HARQ-ACK) feedback are determined according to the SCS of data transmission. For example, if k1=10, the absolute timing between the PDSCH and the corresponding HARQ-ACK feedback is 10×0.125/4, as shown in FIG. 9.

This embodiment describes how to improve the reliability of the PDCCH in a multi-TRP manner.

The same PDCCH may be sent to the same UE by two or three TRPs. The content of the PDCCHs sent by these TRPs is identical. The sending method includes the following:

Method one: Different TRPs send the PDCCHs to the same UE on different symbols or slots in a TDM manner. For example, TRP1 sends PDCCH1 to the UE on symbols 0 to 2; TRP2 sends PDCCH2 to the UE on symbols 3 to 5; and TRP3 sends PDCCH3 to the UE on symbols 6 to 8. The content of the DCI carried by the three PDCCHs is completely the same, for example, the DCI for scheduling multiple PDSCH transmissions. After receiving the three PDCCHs, the UE performs combination and demodulation. The reliability performance of the PDCCH can be improved with this method.

Method 2: Different TRPs send the same content of the DCI to the UE in an FDM manner.

For example, the FDM manner includes different carriers, different BWPs, or different REGs. For example, TRP1 sends PDCCH1 to the UE on BWP1; TRP2 sends PDCCH2 to the UE on BWP2; and TRP3 sends PDCCH3 to the UE on BWP3. The content of the DCI carried by the three PDCCHs is completely the same, for example, the DCI for scheduling multiple PUSCH transmissions. After receiving the three PDCCHs, the UE performs combination and demodulation. The reliability performance of the PDCCH can be improved with this method.

This embodiment describes the beam configuration of the PDCCH.

To improve the sending opportunity of the PDCCH on an unlicensed carrier, each CORESET may configure multiple transmission configuration indication (TCI) states for the unlicensed carrier. The base station may perform the LBT on beams corresponding to the multiple TCI states before the unlicensed carriers send the PDCCH or may perform the LBT on the beams corresponding to the multiple TCI states alternately in the priority order. The PDCCH is sent on a beam where the LBT is successfully performed, and the base station notifies subordinate UEs of the beam information through DCI 2_0.

Additionally, whether the base station makes beam indication information to be included in the DCI 2_0 is configured by a radio resource control (RRC) parameter. When the RRC parameter is configured, the position of the beam indication information in the DCI is configured simultaneously. After receiving the beam indication information, the UE receives downlink data in the corresponding beam direction or may use the corresponding beam direction for channel occupancy and sharing to transmit certain uplink data.

In an embodiment, this embodiment of the present application provides an information transmission apparatus that may be implemented by software and/or hardware. The information transmission apparatus is applied to a first communication node that may be any terminal mentioned above, which is not limited in this embodiment.

As shown in FIG. 10, the information processing apparatus provided in this embodiment of the present application mainly includes a detection module 101.

The detection module 101 is configured to detect a PDCCH on multiple consecutive OFDM symbols of one or more slots.

In an embodiment, detecting the PDCCH on the multiple consecutive OFDM symbols of the one or more slots includes detecting the PDCCH on M consecutive OFDM symbols of N slots, where N is an integer greater than or equal to 1, and M is a positive integer greater than 3.

In an embodiment, detecting the PDCCH on the multiple consecutive OFDM symbols of the one or more slots includes detecting a PDCCH transmitted in a repetitive manner on the multiple consecutive OFDM symbols of the one or more slots.

In an embodiment, for the repetitive manner, different SCSs are configured with different numbers of repetitions of a PDCCH.

In an embodiment, the method also includes the procedure described below. It is determined that the PDCCH is transmitted in a repetitive manner in one of the following: configuring a CORESET repetition parameter or a PDCCH repetition factor included in a configured search space.

In an embodiment, detecting the PDCCH on the multiple consecutive OFDM symbols of the one or more slots includes detecting a PDCCH transmitted in a non-repetitive mapping manner on the multiple consecutive OFDM symbols of one slot.

In an embodiment, for the non-repetitive mapping manner, different SCSs support different maximum PDCCH symbol numbers.

In an embodiment, for the non-repetitive mapping manner, the value of duration in a CORESET configuration is any integer between 3 and 14.

In an embodiment, for the non-repetitive mapping manner, mapping one PDCCH to multiple OFDM symbols includes one of modifying the number of REGs included in one resource element group (REG) bundle to $$m \times N_{symb}^{CORESET}$$

and the number of REGs included in one control channel element (CCE) to $$n \times N_{symb}^{CORESET},$$

where m and n are positive integers greater than 1; limiting a CCE aggregation level supported by one PDCCH such that one PDCCH occupies an integer number of REG bundles; or modifying a REG serial number to the frequency domain first.

In an embodiment, the PDCCH and a scheduled PDSCH or PUSCH adopt different SCSs.

In an embodiment, the PDCCH carries beam indication information configured to indicate a beam for sending and receiving data.

The information transmission apparatus provided in this embodiment may perform the information transmission method provided in any embodiment of the present application and has corresponding function modules and beneficial effects for performing the method. For technical details not described in detail in this embodiment, reference may be made to the information transmission method provided in any embodiment of the present application.

It is to be noted that units and modules involved in the embodiments of the information transmission apparatus are just divided according to functional logic, and the division is not limited to this, as long as the corresponding functions can be achieved. In addition, the specific names of functional units are just intended for distinguishing and are not to limit the scope of the present application.

In an embodiment, this embodiment of the present application provides an information transmission apparatus that may be implemented by software and/or hardware. The information transmission apparatus is applied to a second communication node. The second communication node may be any base station mentioned above, which is not limited in this embodiment.

As shown in FIG. 11, the information processing apparatus provided in this embodiment of the present application mainly includes a sending module 111.

The sending module 111 is configured to send a PDCCH on multiple consecutive OFDM symbols of one or more slots so that a first communication node detects the PDCCH.

In an embodiment, sending the PDCCH on the multiple consecutive OFDM symbols of the one or more slots includes one of sending the PDCCH continuously in a repetitive manner on the one or more slots or mapping the PDCCH to multiple OFDM symbols of one slot in a non-repetitive manner.

In an embodiment, the method also includes the procedure described below.

The PDCCH uses a default SCS.

In an embodiment, the method also includes sending, through different PDCCHs, the same DCI to the same first communication node by multiple TRPs.

In an embodiment, sending, through the different PDCCHs, the same DCI to the same first communication node by the multiple TRPs includes one of the following:
> sending, by different TRPs, the PDCCHs to the same first communication node in a TDM manner; or
> sending, by different TRPs, the same DCI to the same first communication node through the different PDCCHs in an FDM manner.

The information transmission apparatus provided in this embodiment may perform the information transmission method provided in any embodiment of the present application and has corresponding function modules and beneficial effects for performing the method. For technical details not described in detail in this embodiment, reference may be made to the information transmission method provided in any embodiment of the present application.

It is to be noted that units and modules involved in the embodiments of the information transmission apparatus are just divided according to functional logic, and the division is not limited to this, as long as the corresponding functions can be achieved. In addition, the specific names of functional units are just intended for distinguishing and are not to limit the scope of the present application.

Figure 12:
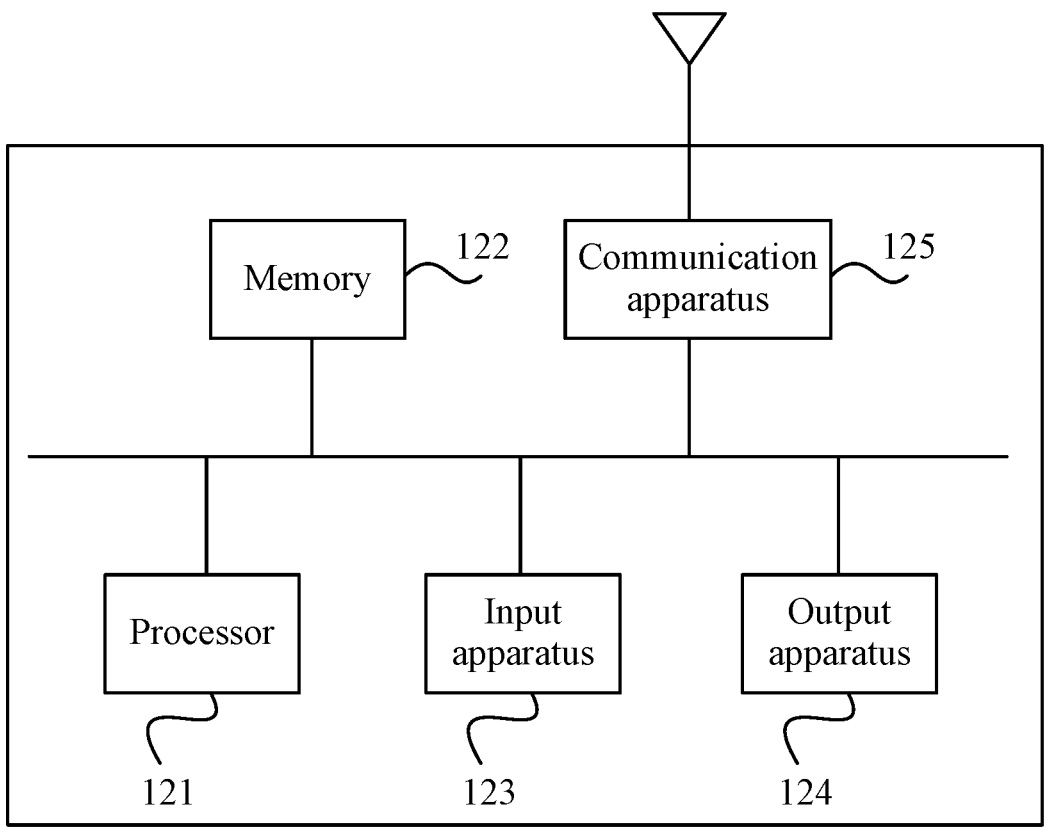
FIG. 12 is a diagram illustrating an information transmission device according to an embodiment of the present application.

An embodiment of the present application also provides a device. FIG. 12 is a diagram illustrating a device according to an embodiment of the present application. As shown in FIG. 12, the device includes a processor 121, a memory 122, an input apparatus 123, an output apparatus 124, and a communication apparatus 1212. One or more processors 121 may be provided in the device. One processor 121 is used as an example in FIG. 12. The processor 121, the memory 122, the input apparatus 123, and the output apparatus 124 in the device may be connected through a bus or other means. In FIG. 12, the connection through a bus is used as an example.

As a computer-readable storage medium, the memory 122 may be configured to store a software program, a computer executable program, and a module, for example, a program instruction/module corresponding to the method in the embodiments of the present application. The processor 121 executes software programs, instructions, and modules stored in the memory 122 to perform various function applications and data processing of the device, that is, to implement any method provided by embodiments of the present application.

The memory 122 may include a program storage region and a data storage region. The program storage region may store an operating system and an application program required by at least one function. The data storage region may store data created according to the use of the device. Additionally, the memory 122 may include a high-speed random-access memory and may also include a nonvolatile memory such as at least one disk memory, flash memory, or another nonvolatile solid-state memory. In some examples, the memory 122 may include memories that are remotely disposed relative to the processor 121, and these remote memories may be connected to the device via a network. Examples of the preceding network include, but are not limited to, the Internet, an intranet, a local area network, a mobile communication network, and a combination thereof.

The input apparatus 123 may be configured to receive input digital or character information and generate key signal input related to user settings and function control of the device. The output apparatus 124 may include a display device such as a display screen.

The communication apparatus 125 may include a receiver and a transmitter. The communication apparatus 125 is configured to perform information transceiving communication under the control of the processor 121.

In an example embodiment, embodiments of the present application also provide a storage medium including computer-executable instructions. The computer-executable instructions, when executed by a computer processor, implement an information transmission method applied to a first communication node. The method includes the following:

A physical downlink control channel (PDCCH) is detected on multiple consecutive OFDM symbols of one or more slots.

Of course, the embodiments of the present application provide a storage medium including computer-executable instructions. The computer-executable instructions may implement not only the operations in the preceding method but also the related operations in the information transmission methods provided in any embodiment of the present application.

In an example embodiment, embodiments of the present application also provide a storage medium including computer-executable instructions. The computer-executable instructions, when executed by a computer processor, implement an information transmission method applied to a second communication node. The method includes the following:

A physical downlink control channel (PDCCH) is sent on multiple consecutive OFDM symbols of one or more slots so that a first communication node detects the PDCCH.

Of course, the embodiments of the present application provide a storage medium including computer-executable instructions. The computer-executable instructions may implement not only the operations in the preceding method but also the related operations in the information transmission methods provided in any embodiment of the present application. The storage medium including computer-executable instructions may be a non-transient computer-readable storage medium.

From the preceding description of the embodiments, it is apparent to those skilled in the art that the present application may be implemented by use of software and necessary general-purpose hardware or may be implemented by hardware. Based on this understanding, the technical solutions of the present application substantially, or the part contributing to the related art, may be embodied in the form of a software product. The computer software product may be stored in a computer-readable storage medium such as a floppy disk, a read-only memory (ROM), a random-access memory (RAM), a flash memory, a hard disk, or an optical disk of a computer and includes multiple instructions for causing a computer device (which may be a personal computer, a server, or a network device) to perform the method in any embodiment of the present application.

The preceding content is only example embodiments of the present application and not intended to limit the scope of the present application.

It is to be understood by those skilled in the art that the term user terminal encompasses any suitable type of wireless user device, for example, a mobile phone, a portable data processing apparatus, a portable web browser, or a vehicle-mounted mobile station.

Generally speaking, various embodiments of the present application may be implemented in hardware or special-purpose circuits, software, logic, or any combination thereof. For example, some aspects may be implemented in hardware while another aspects may be implemented in firmware or software executable by a controller, a micro-processor, or another calculation apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

A block diagram of any logic flow among the drawings of the present application may represent program procedures, may represent interconnected logic circuits, modules, and functions, or may represent a combination of program procedures with logic circuits, modules, and functions. Computer programs may be stored in a memory. The memory may be of any type suitable for a local technical environment and may be implemented by using any suitable data storage technology, such as, but not limited to, a read-only memory (ROM), a random-access memory (RAM), and an optical memory apparatus and system (a digital video disc (DVD) or a compact disk (CD)). Computer-readable media may include non-transitory storage media. A data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without deviating from the scope of the present application. Accordingly, the proper scope of the present application is determined according to the claims.

What is claimed is:

1. An information transmission method, being applied to a terminal and comprising:

detecting a physical downlink control channel (PDCCH) received from a base station on a plurality of consecutive orthogonal frequency-division multiplexing (OFDM) symbols of at least one slot;

wherein detecting the PDCCH on the plurality of consecutive OFDM symbols of the at least one slot comprises:

detecting a PDCCH transmitted in a non-repetitive mapping manner on the plurality of consecutive OFDM symbols of one slot;

wherein for the non-repetitive mapping manner, mapping one PDCCH to a plurality of OFDM symbols comprises one of the following:

modifying a number of resource element groups (REGs) included in one REG bundle to $$m \times N_{symb}^{CORESET}$$

and a number of REGs included in one control channel element (CCE) to $$n \times N_{symb}^{CORESET},$$

wherein m ana n are each a positive integer greater than 1;

limiting a CCE aggregation level supported by the one PDCCH such that the one PDCCH occupies an integer number of REG bundles; or modifying a REG serial number to a frequency domain first.

2. The method of claim 1, wherein detecting the PDCCH on the plurality of consecutive OFDM symbols of the at least one slot comprises:

detecting the PDCCH on M consecutive OFDM symbols of N slots, wherein Nis an integer greater than or equal to 1, and M is a positive integer greater than 3.

3. The method of claim 1, wherein for the non-repetitive mapping manner, different SCSs support different maximum PDCCH symbol numbers.

4. The method of claim 1, wherein for the non-repetitive mapping manner, a value of duration in a CORESET configuration is an integer between 3 and 14.

5. The method of claim 1, wherein a physical downlink shared channel (PDSCH) or a physical uplink shared channel (PUSCH) scheduled by the PDCCH uses a different SCS from the PDCCH.

6. The method of claim 1, wherein the PDCCH carries beam indication information configured to indicate a beam for sending and receiving data.

7. An information transmission method, being applied to a base station and comprising:

sending a physical downlink control channel (PDCCH) to a terminal on a plurality of consecutive orthogonal frequency-division multiplexing (OFDM) symbols of at least one slot so that the terminal detects the PDCCH;

wherein sending the PDCCH on the plurality of consecutive OFDM symbols of the at least one slot comprises:

mapping the PDCCH to the plurality of consecutive OFDM symbols of one slot in a non-repetitive manner;

wherein for the non-repetitive mapping manner, mapping one PDCCH to a plurality of OFDM symbols comprises one of the following:

modifying a number of resource element groups (REGs) included in one REG bundle to $$m \times N_{symb}^{CORESET}$$

and a number of REGs included in one control channel element (CCE) to $$n \times N_{symb}^{CORESET},$$

wherein m and n are each a positive integer greater than 1;

limiting a CCE aggregation level supported by the one PDCCH such that the one PDCCH occupies an integer number of REG bundles; or modifying a REG serial number to a frequency domain first.

8. The method of claim 7, further comprising:

using, by the PDCCH, a default sub-carrier spacing (SCS).

9. The method of claim 7, further comprising:

sending, through different PDCCHs, same downlink control information (DCI) to a same terminal by multiple transmission and reception points (TRPs).

10. The method of claim 9, wherein sending, through the different PDCCHs, the same DCI to the same terminal by the multiple TRPs comprises one of the following manners:

sending, by different TRPs, the PDCCHs to the same terminal in a time-division multiplexing (TDM) manner; or sending, by different TRPs, the same DCI to the same terminal through the different PDCCHs in a frequency-division multiplexing (FDM) manner.

11. An information transmission device, comprising:

at least one processor; and a memory configured to store at least one program;

wherein when executed by the at least one processor, the at least one program causes the at least one processor to perform the information transmission method of claim 1.

12. A non-transitory computer-readable storage medium storing a computer program which, when executed by a processor, performs the information transmission method of claim 1.

13. An information transmission device, comprising:

at least one processor; and a memory configured to store at least one program;

wherein when executed by the at least one processor, the
at least one program causes the at least one processor
to perform the information transmission method of
claim 7.

* * * * *